United States Patent [19]

Howard

[11] 4,112,017

[45] Sep. 5, 1978

[54] RADIATION CURABLE COATING COMPOSITIONS

[75] Inventor: Dennis D. Howard, Girard, Pa.

[73] Assignee: Lord Corporation, Erie, Pa.

[21] Appl. No.: 710,776

[22] Filed: Aug. 2, 1976

Related U.S. Application Data

[63] Continuation-in-part of Ser. No. 708,155, Jul. 23, 1976.

[51] Int. Cl.$^2$ .............................................. C08L 75/00
[52] U.S. Cl. ............................ 260/859 R; 204/159.15
[58] Field of Search .................... 260/859; 204/159.15

[56] References Cited

U.S. PATENT DOCUMENTS

| | | | |
|---|---|---|---|
| 3,509,234 | 4/1970 | Burlant | 260/859 R |
| 3,531,364 | 9/1970 | Schmidle | 260/859 R |
| 3,641,199 | 2/1972 | Niederhauser | 260/859 R |
| 3,642,943 | 2/1972 | Noel | 260/859 R |
| 3,677,920 | 7/1972 | Kai | 260/3 |
| 3,719,638 | 3/1973 | Huemmer | 260/859 R |
| 3,829,531 | 8/1974 | Graff | 260/859 R |
| 3,856,830 | 12/1974 | Kuehn | 260/859 R |
| 3,907,751 | 9/1975 | Knight | 260/859 R |
| 3,975,457 | 8/1976 | Chang | 260/859 R |

*Primary Examiner*—Paul Lieberman
*Attorney, Agent, or Firm*—John A. Gazewood

[57] ABSTRACT

Unsaturated addition-polymerizable urethane resins prepared from polyester polyols based on (1) at least one glycol selected from the group consisting of 1,3-butylene glycol and neopentyl glycol; (2) adipic acid; (3) isophthalic acid; and, optionally, (4) at least one aliphatic polyhydroxy compound containing at least three hydroxy groups are characterized by reduced viscosity, improved physical stability, and by improved solubility and compatibility in organic solvents/diluents. Particularly advantageous resins are obtained by employing isocyanate-functional prepolymers based on the subject polyester polyols, with isocyanate-functional prepolymers obtained by reacting the polyester polyol compounds with organic polyisocyanate compounds at an NCO:OH ratio greater than 2:1 being especially preferred, as precursors for such unsaturated addition-polymerizable urethane resins.

35 Claims, No Drawings

RADIATION CURABLE COATING COMPOSITIONS

This application is a continuation-in-part of application Ser. No. 708,155, filed July 23, 1976.

This invention relates to radiation curable coating and ink compositions. More particularly, the invention relates to unsaturated addition-polymerizable urethane resins derived from polyester polyols based on 1,3-butylene glycol and/or neopentyl glycol, adipic acid, isophthalic acid, and, optionally, at least one aliphatic polyhydroxy compound containing at least three hydroxy groups; and to radiation curable compositions containing such resins.

Increasing concern with energy, environmental protection, and health factors have cooperated to enhance the potential of radiation curable coatings. In principle, such coatings comprise a polymerizable mixture that can be applied as a thin film to a substrate and polymerized at a rapid rate by exposure to a radiation source such as an electron beam, plasma arc, ultra violet light, and the like. Advantages of radiation curable coatings include a practical method of at least reducing air pollution from volatile vapor loss, rapid cure rates at ambient temperatures, reduced operating costs, the use of heat-sensitive substrates, and improved product performance.

Among the more notable achievements in the field of radiation curing has been the development of the so-called 100 percent reactive solids systems based on unsaturated addition-polymerizable urethane resins. A characteristic feature of such systems is the essential absence of conventional inert volatile solvents. Instead, the systems contain reactive diluents which react during curing to become an integral part of the cured coating. Such systems have been widely accepted commercially. While such systems provide high performance coatings which can be cured at high line speeds, they have also provided a new set of problems for the coatings formulators.

While unsaturated addition-polymerizable urethane resins can be prepared by several known reaction routes, the preferred method of preparation for obtaining premium-quality coatings is by capping an isocyanate-functional prepolymer with an appropriate addition-polymerizable monomer having a single isocyanate-reactive active hydrogen group, with the reaction being effected in the presence of a diluent system which is inert with respect to the capping reaction but which is reactive with the unsaturated addition-polymerizable urethane resins at cure conditions. Among the more vexing of the problems associated with radiation curable compositions containing such polymerizable urethane resins, regardless of how the resin is prepared, are the high viscosity of the resin compositions which makes application by conventional industrial techniques extremely difficult, if not impossible, the difficulty of solvating the resinous compounds; physical instability of the compositions which is evidenced by thixotropy and/or cloudiness leading to eventual separation of the compositions into distinct resin-rich and monomer-rich phases and an incompatibility between resinous and non-resinous compositions which is more evident with higher molecular weight components. Because the use of conventional inert solvents/diluents such as are employed with moisture-cure polyurethanes is undesirable, there have been developed the so-called reactive diluent systems, which generally comprise a mixture of monofunctional and polyfunctional unsaturated addition-polymerizable monomeric compounds which are copolymerizable with the unsaturated addition-polymerizable urethane resins and thus become part of the cured coating. However, these reactive diluent systems are not without problems. For example, certain of the lower molecular weight monomeric diluents are quite effective in affording clear coating compositions which can be applied by conventional industrial techniques, however, their use in diluent systems is often undesirable because of their relatively high volatility even at the relatively low temperatures encountered during the curing cycle, which results in diluent loss, noxious fumes, increased atmospheric emissions, and a fogging above the work surface which interferes with energy transmission and adversely affects rate and degree of cure. These problems which are associated with the higher solvating low molecular weight monomer diluents can be largely overcome by employing as reactive monomer diluents acrylic and methacrylic acid esters containing at least six carbon atoms in the non-acid moiety of the molecule. While such acrylic and methacrylic acid esters are preferred because they do not present the volatility, noxious and curing problems associated with the lower molecular weight diluents, they are not without their problems. Generally, greater amounts of the acrylic and methacrylic acid esters having at least six carbon atoms in the non-acid moiety of the molecule are required for effective viscosity reduction. Because of their lower solvating power, the problems of physical instability and incompatibility of resin and diluent components are generally greater with diluent systems containing the less-volatile acrylic and methacrylic acid esters. Thus there remains a need to produce radiation curable compositions which will remain homogenous, which can be readily and uniformly applied to substrates, and which can be rapidly and fully cured to a dried film having the desired physical and chemical properties. It is equally important that harmful emissions to the atmosphere, noxiousness and other hazards be at least reduced, if not entirely eliminated.

During the course of extensive studies relating to the physical and chemical nature of radiation curable compositions, particularly such compositions containing unsaturated addition-polymerizable urethane resins, it was discovered that the composition of the resinous component markedly affects viscosity and physical stability of the compositions, as well as solubility and compatibility of the resinous components with respect to the reactive diluent system. More particularly, in accordance with the present invention, it has been discovered that unsaturated addition-polymerizable urethane resins which have been derived from polyester polyols based on 1,3-butylene glycol and/or neopentyl glycol, adipic acid, isophthalic acid and, optionally and preferably, at least one aliphatic polyhydroxy compound containing at least three hydroxyl groups can be employed to formulate radiation curable compositions having as characteristic features reduced viscosity and improved physical stability. The unsaturated addition-polymerizable urethane resins prepared in accordance with this invention are readily solvatable, i.e., made increasingly liquid, in and more compatible with acrylic and methacrylic acid esters having at least six carbon atoms in the non-acid moiety of the ester molecule and permit the use of such low-volatility diluents at higher diluent levels than heretofore. The present invention further provides compositions having a more manageable viscosity at higher resins content than heretofore possible.

More particularly, there are provided by the present invention unsaturated addition-polymerizable urethane resins having as a characteristic feature a backbone segment consisting essentially of the residue of a polyester polyol based on (1) at least one glycol selected from the group consisting of 1,3-butylene glycol and neopentyl glycol, (2) adipic acid, (3) isophthalic acid, and (4), optionally and preferably, at least one aliphatic polyhydroxy compound containing at least three hydroxyl groups. The invention further provides radiation curable coating and ink compositions comprising at least one unsaturated addition-polymerizable urethane resin prepared in accordance with the present invention, a diluent system comprising at least one unsaturated addition-polymerizable monomeric compound which is copolymerizable with said unsaturated addition-polymerizable urethane resin, preferably containing at least one unsaturated addition-polymerizable monofunctional monomeric compound selected from the group consisting of esters having the general formula

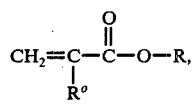

wherein $R^o$ is hydrogen or methyl and R is an aliphatic or cycloaliphatic, preferably alkyl or cycloalkyl, group having from 6 to 18, preferably 6 to 9, carbon atoms; and, optionally, an effective amount of at least one photo-initiator compound; the amount of such unsaturated addition-polymerizable urethane resin being in the range from about 30 to about 90, preferably from about 50 to about 75, weight percent, based on total weight of unsaturated addition-polymerizable urethane resin and reactive diluent system. The photoinitiator compound, which will generally be employed when curing is effected with a low energy radiation source such as ultraviolet light radiation, will generally be in the range from about 0.01 to about 30, preferably about 0.1 to about 15, parts by weight per 100 parts by combined weight of unsaturated addition-polymerizable urethane resin and reactive diluent system.

Unsaturated addition-polymerizable urethane resins, which for brevity will hereinafter in the disclosure and claims be referred to as unsaturated urethane resins, are well known in the art. Such resins comprise the reaction product of at least one polyisocyanate, at least one monomeric or polymeric organic compound characterized by the presence of at least 2 isocyanate-reactive active hydrogen groups, and at least one unsaturated addition-polymerizable monomeric organic compound characterized by the presence of a single isocyanate-reactive active hydrogen group. While unsaturated urethane resins can be prepared by any one of several known reaction routes, the method wherein an isocyanate-functional prepolymer, obtained by reacting polyisocyanate compounds having at least two isocyanate groups and organic polyols having at least two hydroxyl groups at an NCO:OH ratio greater than 1:1, preferably greater than 2:1, and especially in the range of 2.5–5:1, is fully capped with an appropriate unsaturated addition-polymerizable monomer having a single isocyanate-reactive active hydrogen group, such as 2-hydroxyethylacrylate, is presently preferred.

Unsaturated urethane resins which are suitable for use in the practice of this have as a first characteristic feature, at least one, preferably at least two, polymerizable ethylenically unsaturated group(s) having the structure $>C=C<$. The polymerizable ethylenically unsaturated moiety is preferably a terminal vinyl group having the structure $CH_2=C<$. Especially preferred unsaturated urethane resins are the acrylyl urethane resins, i.e., unsaturated urethane resins containing a polymerizable acrylyl, methacrylyl, acrylamide, methacrylamide, and the like, moiety in the molecule, characterized by the presence of at least one, preferably at least two, terminal ethylenically unsaturated group(s) having the structure $CH_2=C<$.

The unsaturated urethane resins of the present invention are further characterized by the presence in the backbone of the resin molecule of a segment consisting essentially of the residue of a polyester polyol based on (1) 1,3-butylene glycol and/or neopentyl glycol; (2) adipic acid; (3) isophthalic acid; and (4), optionally and preferably, at least one aliphatic polyhydroxy compound containing at least three hydroxyl groups. Thus it is a critical feature of the present invention that, in preparing the unsaturated urethane resins, there be employed as active hydrogen group-containing precursors polyester polyols obtained by the reaction of at least one glycol selected from the group consisting of 1,3-butylene glycol and neopentyl glycol, adipic acid, isophthalic acid, and from zero to about 50, preferably zero to about 30, mol percent, of at least one aliphatic polyol having at least three hydroxyl groups, said mol percents being based on total mols of glycol and polyol. It is essential that both adipic acid and isophthalic acid be employed in preparing the polyester polyols, with the isophthalic acid being empoloyed in an amount in the range from about 1 to about 50, preferably about 5 to about 25, mol percent, based on total mols of adipic acid and isophthalic acid. Preferred polyester polyols will have molecular weights in the range from about 200 to about 4,000, with molecular weights in the range from about 500 to about 2000 being presently preferred. The polyester polyol precursors are prepared by conventional well-known methods which require no further elaboration.

As indicated, in forming the polyester polyols which are employed in the practice of this invention, the glycol compounds can be optionally and preferably replaced with up to about 50 mol percent of at least one aliphatic polyol compound having at least three hydroxyl groups. It is presently preferred to employ an amount of polyol which is sufficient to afford polyester polyol compounds having an average hydroxyl functionality of at least 2.1, preferably in the range of about 2.2 to about 2.7. Representative polyols having at least three carbon atoms include, without limitation, glycerine, erythritol, 1,2,6-hexanetriol, trimethylol propane, pentaerythritol, and the like, with glycerine being presently preferred.

The polyisocyanates which can be employed in forming unsaturated urethane resins in accordance with the present invention can be any organic isocyanate compound having at least two isocyanate groups, including mixtures of such compounds. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates include, without limitation, tolylene-2,4-diisocyanate, 2,2,4-trimethylhexamethylene-1,6-diisocyanate, hexamethylene-1,6-diisocyanate, diphenylmethane-4,4'-diisocyanate, triphenylmethane-4,4',4"-triisocyanate, polymethylene polyphenylisocyanate, m-phenylene diisocyanate, p-phenylene diisocyanate, 2,6-tolylene diisocyanate, 1,5-naphthalene diisocyanate, naphthalene-1,4-diisocyanate, diphenylene-4,4'-diisocyanate, 3,3'-bi-tolylene-4,4'-diisocyanate, 1,4-cyclohexylene dimethylene diisocyanate, xylylene-1,4-diisocyanate, xylylene-1,3-diisocyanate, cyclohexyl-1,4-diisocyanate, 4,4'-methylene-bis(cyclohexyl isocyanate), 3,3'-dimethyldiphenylmethane-4,4'-diisocyanate, isophorone diisocyanate, the product obtained by reacting trimethylol propane and 2,4-tolylene diisocyanate in a molar ratio of 1:3, and the like.

The unsaturated addition-polymerizable monomeric organic compounds characterized by the presence of a single isocyanate-reactive active hydrogen group which can be employed in forming unsaturated urethane resins in accordance with the present invention include, without limitation thereto, 2-hydroxyethyl acrylate, 2-hydroxyethyl methacrylate, 2-hydroxypropyl acrylate 2-hydroxypropyl methacrylate, N-hydroxymethyl acrylamide, N-hydroxymethyl methacrylamide, diethylene glycol monoacrylate, diethylene glycol monomethacrylate, glycerine dimethacrylate, trimethylol propane dimethacrylate, and the like.

In forming unsaturated urethane resins according to this invention, the polyisocyanate compounds are employed in an amount sufficient to afford an NCO:OH ratio, with respect to the amount of polyester polyol, in excess of 1:1, preferably in excess of 2:1, and preferably in the range of 2.5–5:1. The amount of unsaturated addition-polymerizable monomeric compound characterized by the presence of a single isocyanate-reactive active hydrogen group will be sufficient to react with at least one unreacted isocyanate group, and is preferably an amount sufficient to afford an active hydrogen group:NCO ratio, with respect to the amount of excess polyisocyanate, of at least 1:1, with a slight excess being presently preferred. The unsaturated urethane resins can be prepared by any of the known methods; however, as has been indicated, it is preferred to first form an isocyanate-functional prepolymer in a known manner and to react the prepolymer in a discrete step with the unsaturated addition-polymerizable monomeric compound having a single isocyanate-reactive active hydrogen group. Where diluents are employed, it is preferred that the diluent medium comprise at least one unsaturated addition-polymerizable monomer which is copolymerizable with the unsaturated urethane resin at curing conditions but is otherwise inert with respect to preparing the unsaturated urethane resin.

A further essential ingredient of the coating compositions of this invention comprises a reactive diluent system. Broadly, the reactive diluent comprises at least one unsaturated addition-polymerizable monomer which is copolymerizable with the unsaturated urethane resin upon exposure to radiation. The reactive diluent can be monofunctional or polyfunctional. A single polyfunctional diluent can be used, as can mixtures thereof; or a combination of one or more monofunctional reactive diluents and one or more polyfunctional reactive diluents can be used. Such combinations of mono- and polyfunctional reactive diluents are presently preferred. Generally, the reactive diluent system will comprise from about 10 to about 65, preferably about 25 to about 50, weight percent, based on total weight of unsaturated urethane resin and reactive diluent, of the radiation curable compositions of the invention. Illustrative of such reactive diluents are styrene, methyl methacrylate, butyl acrylate, isobutyl acrylate, 2-ethylhexyl acrylate, 2-phenoxy acrylate, 2-methoxyethyl acrylate, 2-(N,N-diethylamino)-ethyl acrylate, the corresponding methacrylates, acrylonitrile, methyl acrylo nitrile, methacrylamide, neopentyl glycol diacrylate, ethylene glycol diacrylate, hexylene glycol diacrylate, diethylene glycol diacrylate, trimethylol propane triacrylate, pentaerythritol di-, tri-, or tetra-acrylate, the corresponding methacrylates, vinyl pyrrolidone, and the like. It is preferred that the reactive diluent systems contain at least one unsaturated addition-polymerizable monofunctional monomeric compound selected from the group consisting of esters having the general formula

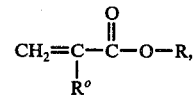

where R° is hydrogen or methyl and R is an aliphatic or cycloaliphatic, preferably alkyl or cycloalkyl, group having from 6 to 18, preferably 6 to 9 carbon atoms. Representative of such esters are hexyl acrylate, cyclohexyl acrylate, 2-ethyl hexyl acrylate, octyl acrylate, nonyl acrylate, stearyl acrylate, and the corresponding methacrylates. At the present time, it is preferred that the diluent system contain at least 50 weight percent of acrylic and methacrylic acid esters having at least 6 carbon atoms in the non-acid moiety of the molecule, with the balance comprising one or more of the monofunctional and polyfunctional monomeric diluents. Generally, the reactive diluent system will comprise from about 10 to about 70, preferably about 25 to about 50, weight percent, based on total weight of unsaturated urethane resin and reactive diluent system, of the radiation curable compositions of the invention. Reactive diluent systems are well known to those skilled in the art of radiation curing and the selection of an appropriate diluent system in any given instance is sufficiently encompassed by such knowledge as to require no further discussion here.

As previously indicated, a photoinitiator system will generally be employed when curing is effected by exposure to low energy radiation sources such as ultra violet light. Any of the known photoinitiators can be used within the concentration ranges previously set forth. Illustrative photoinitiators, without limitation thereto, include benzophenone, benzoin, acetophenone, benzoin methyl ether, Michler's ketone, benzoin butyl ether, xanthone, thioxanthone, propiophenone, fluorenone, carbazole, diethoxyacetophenone, the 2-, 3- and 4-methylacetophenones and methoxyacetophenones, the 2- and 3-chloroxanthones and chlorothioxanthones, 2-acetyl-4-methylphenyl acetate, 2,2'-dimethoxy-2-phenylacetophenone, benzaldehyde, fluorene, anthroquinone, triphenylamine, 3- and 4-allylacetophenone, p-diacetylbenzene, 3-chloro-2-nonylxanthone, and the like, and mixtures thereof.

The invention compositions can also include pigments, fillers, wetting agents, flatting agents, flow control agents, and other additives typically present in coating compositions. In some applications, the inclusion of minor amounts on inert solvents can be advantageous. Such additive materials are well known to those skilled in the art and do not require further elaboration herein. Equally well known are the concentrations at which such additives are used.

The radiation curable compositions of the present invention are characterized by improved flowability, fluidity, and physical stability. The compositions of the invention can be applied to wood, metal, fabric, and plastic substrates in an economical and efficient manner employing conventional industrial techniques and cure rapidly to dried films having excellent physical and chemical properties. The use of the herein described unsaturated urethane resins permits the use as diluents of acrylic and methacrylic acid esters containing at least 6 carbon atoms in the non-acid moiety, which, while preferred because they are less volatile, less expensive, and generally less hazardous to handle, are poorer solvating monomers and tend to be more incompatible with the unsaturated urethane resins.

The improved coating compositions of this invention can be applied and cured by any of the conventional known methods. Application can be by roll coating, curtain coating, airless spray, dipping or by any other procedure. The cure can be effected by exposure to any high energy source, such as ionizing radiation, or low energy source, such as ultraviolet light radiation. The equipment utilized for curing, as well as the appropriate time for curing, and the conditions under which the curing is effected are well-known to those skilled in the art of radiation curing and do not require further elaboration herein.

The following Examples are provided to further illustrate the invention. In these Examples, amounts are in parts by weight, unless otherwise noted.

EXAMPLE I

A series of unsaturated urethane resins are prepared in 2-ethylhexyl acrylate reactive monomer diluent at a resin concentration of 70 percent employing as precursor compounds polyester polyol, 4,4'-methylene-bis(cyclohexyl isocyanate), and 2-hydroxyethyl acrylate. In each instance, the polyester polyol compound is reacted with the isocyanate compound at an NCO:OH ratio of 2.5:1 to form an isocyanate-functional prepolymer; and the prepolymer is fully capped with 2-hydroxyethyl acrylate to form an ethylenically unsaturated acrylyl urethane having at least two terminal vinyl groups and substantially no free isocyanate functions. The resins are evaluated with respect to solubility in 2-ethylhexyl acrylate-reactive monomer diluent and physical stability, including thixotropy and cloudiness, in 2-ethylhexyl acrylate reactive monomer diluent. The precursor materials and the results of the resin evaluation are reported in Table I.

TABLE I

| Resin | | Evaluation |
|---|---|---|
| | 2-Hydroxyethyl Acrylate | |
| | 4,4'-Methylene-Bis (Cyclohexyl Isocyanate) | |
| | Polyester Polyol | |
| 1 | Diethylene Glycol/Adipic Acid | Insoluble |
| 2 | 1,6-Hexanediol/Trimethylol Propane/Adipic Acid | Thixotropic |
| 3 | 1,3-Butylene Glycol/Trimethylol Propane/Adipic Acid | Thixotropic |
| 4 | 1,4-Butanediol/Glycerine/Adipic Acid (90)/Isophthalic Acid (10) | Insoluble |
| 5 | 1,3-Butylene Glycol/Glycerine/Adipic Acid (90)/Isophthalic Acid (10) | Soluble |
| 6 | 1,3-Butylene Glycol/Glycerine/Adipic Acid | Insoluble |
| 7 | 1,3-Butylene Glycol/Glycerine/Adipic Acid (75)/Isophthalic Acid (25) | Cloudy [a] |
| 8 | 1,3-Butylene Glycol/Glycerine/Adipic Acid (80) Isophthalic Acid (20) | Cloudy [a] |
| 9 | 1,4-Cyclohexanedimethylol/Glycerine/Adipic Acid (90)/Isophthalic Acid (10) | Insoluble |
| 10 | 1,3-Butylene Glycol (50)/Neopentyl Glycol (50)/Glycerine/Adipic Acid (90)/Isophthalic Acid (10) | Soluble |
| 11 | 1,3-Butylene Glycol(50)/1,6-Hexanediol (50)/Glycerine/Adipic Acid (90)/Isophthalic Acid (10) | Thixotropic |
| 12 | Neopentyl Glycol/Glycerine/Adipic Acid (90)/Isophthalic Acid (10) | Soluble |
| 13 | Polycaprolactone Polyol | Soluble [b] |

[a] When diluted to 60% resin concentration, time to form separate monomer-rich and resin-rich phases is 730 days.
[b] When diluted to 60% resin concentration, time to form separate monomer-rich and resin-rich phases is 24 hours.

The data demonstrate that unsaturated urethane resins which are obtained from polyester polyols derived from 1,3-butylene glycol and/or neopentyl glycol, adipic acid, isophthalic acid, and, optionally, at least one polyol having at least three hydroxyl groups have a lower viscosity and improved physical stability. The data further demonstrate the necessity of employing both adipic acid and isophthalic acid as well as 1,3-butylene glycol and/or neopentyl glycol.

EXAPLE II

To the unsaturated urethane resin-containing compositions from Example I derived from polyester polyols 5, 10, 12 and 13 there is added an effective amount of benzoin ether-type photoinitiator. The compositions are coated onto aluminum panels and cured by exposure to ultraviolet radiation (200 watts/inch mercury lamp) at a line speed of 50 feet per minute for three passes. Compositions 5, 10 and 12 are less viscous than is composition 13. Film properties of cured films from compositions 5, 10, 12 and 13 are substantially equivalent.

What is claimed is:

1. Unsaturated addition-polymerizable urethane resins characterized by the presence of at least one ethylenically unsaturated terminal group having the structure $CH_2=C<$, said unsaturated urethane resins comprising the reaction product of
   (i) at least one organic isocyanate compound having at least two isocyanate groups;
   (ii) at least one polyester polyol having at least two hydroxy groups, said polyester polyol comprising the reaction product of
      (a) at least one glycol selected from the group consisting of 1,3-butylene glycol and neopentyl glycol;
      (b) adipic acid;
      (c) isophthalic acid; and
      (d) zero to 50 mol percent of at least one aliphatic polyol having at least three hydroxyl groups, said mol percent being based on total moles of glycol and aliphatic polyol;
      the amount of isophthalic acid being in the range from about 5 to about 25 mol percent, based on total mols of adipic acid and isophthalic acid; and
   (iii) at least one unsaturated addition-polymerizable monomeric compound having a single isocyanate-reactive active hydrogen group;

there being present an excess of isocyanate compound with respect to the hydroxyl groups of said polyester polyol, said unsaturated addition-polymerizable monomeric compound having a single isocyanate-reactive active hydrogen group being present in an amount sufficient to provide at least one molar equivalent of active hydrogen group with respect to isocyanate reactivity.

2. Unsaturated urethane resins according to claim 1 wherein said polyester polyol has an average hydroxyl functionality of at least 2.1.

3. Unsaturated urethane resins according to claim 3 wherein said hydroxyl functionality is in the range of about 2.2 to about 2.7.

4. Unsaturated urethane resins according to claim 1 consisting essentially of the reaction product of
(A) at least one isocyanate-functional prepolymer, said prepolymer comprising the reaction product of
(a) at least one organic isocyanate compound having at least two isocyanate groups; and
(b) at least one polyester polyol having at least two hydroxyl groups, said polyester polyol comprising the reaction product of
(i) at least one glycol selected from the group consisting of 1,3-butylene glycol and neopentyl glycol;
(ii) adipic acid;
(iii) isophthalic acid; and
(iv) zero to about 50 mol percent of at least one aliphatic polyol having at least three hydroxyl groups, said mol percent being based on total mols of hydroxyl groups of such glycol and aliphatic polyol,
the amount of isophthalic acid being in the range from about 5 to about 25 mol percent, based on total mols of adipic acid and isophthalic acid;
the amount of such isocyanate compound being sufficient to provide an excess of isocyanate groups with respect to hydroxyl groups of such polyester polyol; and
(B) at least one unsaturated addition-polymerizable monomeric compound having a single isocyanate-reactive active hydrogen group;
the amount of such unsaturated addition-polymerizable monomeric compound having a single isocyanate-reactive active hydrogen group being sufficient to provide at least one molar equivalent of active hydrogen group with respect to the isocyanate groups of such prepolymer.

5. Unsaturated urethane resins according to claim 4 wherein said polyester polyol has an average hydroxyl functionality of at least 2.1.

6. Unsaturated urethane resins according to claim 5 wherein said hydroxyl functionality is in the range of about 2.2 to about 2.7.

7. Unsaturated urethane resins according to claim 1 characterized by the presence of at least two ethylenically unsaturated terminal groups and having substantially no isocyanate reactivity.

8. Unsaturated urethane resins according to claim 7 wherein said polyester polyol has an average hydroxyl functionality of at least 2.1.

9. Unsaturated urethane resins according to claim 8 wherein said hydroxyl functionality is in the range from about 2.2 to about 2.7.

10. Unsaturated urethane resins according to claim 4 wherein the amount of unsaturated addition-polymerizable monomeric compound having a single isocyanate-reactive active hydrogen group is sufficient to provide an active hydrogen group:NCO ratio of at least 1:1.

11. Unsaturated urethane resins according to claim 10 wherein said polyester polyol has an average hydroxyl functionality of at least 2.1.

12. Unsaturated urethane resins according to claim 11 wherein said hydroxyl functionality is in the range from about 2.2 to about 2.7.

13. Unsaturated urethane resins according to claim 10 wherein said hydroxyl functionality is in the range from about 2.2 to about 2.7.

14. A coating composition consisting essentially of
A. at least one unsaturated urethane resin characterized by the presence of at least one ethylenically unsaturated terminal group having the structure $CH_2=C<$, said unsaturated urethane comprising the reaction product of
(i) at least one organic isocyanate compound having at least two isocyanate groups;
(ii) at least one polyester polyol having at least two hydroxy groups, said polyester polyol comprising the reaction product of
(a) at least one glycol selected from the group consisting of 1,3-butylene glycol and neopentyl glycol;
(b) adipic acid;
(c) isophthalic acid; and
(d) zero to 50 mol percent of at least one aliphatic polyol having at least three hydroxyl groups, said mol percent being based on total mols of glycol and aliphatic polyol;
the amount of isophthalic acid being in the range from about 5 to about 25 mol percent, based on total mols of adipic acid and isophthalic acid; and
(iii) at least one unsaturated addition-polymerizable monomeric compound having a single isocyanate-reactive active hydrogen group;
there being present an excess of isocyanate compound with respect to the hydroxyl groups of said polyester polyol,
said unsaturated addition-polymerizable monomeric compound having a single isocyanate-reactive active hydrogen group being present in an amount sufficient to provide at least one molar equivalent of active hydrogen group with respect to isocyanate reactivity;
B. A reactive diluent system comprising at least one unsaturated addition-polymerizable monomeric compound copolymerizable with such unsaturated urethane resin; and
C. 0-30 parts by weight, based on total weight of such unsaturated urethane resin and reactive diluent system, of at least one photoinitiator compound;
the amount of such unsaturated resin being in the range from about 30 to about 90 percent, based on total weight of unsaturated urethane resin and reactive diluent system.

15. Coating compositions according to claim 14 wherein such polyester polyol has an average hydroxyl functionality of at least 2.1.

16. Coating compositions according to claim 15 wherein said hydroxyl functionality is in the range from about 2.2 to about 2.7.

17. Coating compositions according to claim 14 wherein said reactive diluent system contains at least one unsaturated addition-polymerizable mono-functional monomeric compound copolymerizable with such unsaturated urethane resin selected from the group consisting of esters having the general formula

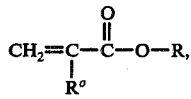

wherein R° is hydrogen or methyl and R is an aliphatic or cycloaliphatic radical having from 6 to 18 carbon atoms.

18. Coating compositions according to claim 17 wherein such polyester polyol has an average hydroxyl functionality of at least 2.1.

19. Coating compositions according to claim 18 wherein said hydroxyl functionality is in the range from about 2.2 to about 2.7.

20. Coating compositions according to claim 14 wherein said unsaturated urethane resin consisting essentially of the reaction product of
A. at least one isocyanate-functional prepolymer, said prepolymer comprising the reaction product of
 (a) at least one organic isocyanate compound having at least two hydroxyl groups; and
 (b) at least one polyester polyol having at least two hydroxy groups, said polyester polyol comprising the reaction product of
  (i) at least one glycol selected from the group consisting of 1,3-butylene glycol and neopentyl glycol;
  (ii) adipic acid;
  (iii) isophthalic acid; and
  (iv) zero to about 50 mol percent of at least one aliphatic polyol having at least three hydroxyl groups, said mol percent being based on total mols of hydroxyl groups of such glycol and aliphatic polyol,
 the amount of isophthalic acid being in the range from about 5 to about 25 mol percent, based on total mols of adipic acid and isophthalic acid;
 the amount of such isocyanate compound being sufficient to provide an excess of isocyanate groups with respect to hydroxyl groups of such polyester polyol; and
B. at least one unsaturated addition-polymerizable monomeric compound having a single isocyanate-reactive active hydrogen group;
the amount of such unsaturated addition-polymerizable monomeric compound having a single isocyanate-reactive active hydrogen group being sufficient to provide at least one molar equipment of active hydrogen group with respect to the isocyanate groups of such prepolymer.

21. Coating compositions according to claim 20 wherein said polyester polyol has an average hydroxyl functionality of at least 2.1.

22. Coating compositions according to claim 21 wherein said hydroxyl functionality is in the range from about 2.2 to about 2.7.

23. Coating compositions according to claim 20 wherein said reactive diluent system contains at least one unsaturated addition-polymerizable mono-functional monomeric compound copolymerizable with such unsaturated urethane resin selected from the group consisting of esters having the general formula

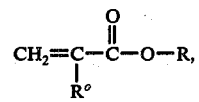

wherein R° is hydrogen or methyl and R is an aliphatic or cycloaliphatic radical having from 6 to 18 carbon atoms.

24. Coating compositions according to claim 23 wherein such polyester polyol has an average hydroxyl functionality of at least 2.1.

25. Coating compositions according to claim 24 wherein such hydroxyl functionality is in the range from about 2.2 to about 2.7.

26. Coating compositions according to claim 20 wherein the amount of said unsaturated addition-polymerizable monomeric compound having a single isocyanate-reactive active hydrogen group is sufficient to provide an active hydrogen group:NCO NCO ratio of at least 1:1.

27. Coating compositions according to claim 26 wherein said polyester polyol has an average hydroxyl functionality of at least 2.1.

28. Coating compositions according to claim 27 wherein said hydroxyl functionality is in the range from about 2.2 to about 2.7.

29. Coating compositions according to claim 26 wherein said reactive diluent system contains at least one unsaturated addition-polymerizable mono-functional monomeric compound copolymerizable with such unsaturated urethane resin selected from the group consisting of esters having the general formula

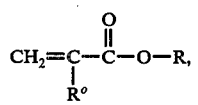

wherein R° is hydrogen or methyl and R is an aliphatic or cycloaliphatic radical having from 6 to 18 carbon atoms.

30. Coating compositions according to claim 29 wherein said polyester polyol has an average hydroxyl functionality of at least 2.1.

31. Coating compositions according to claim 30 wherein said hydroxyl functionality is in the range from about 2.2 to about 2.7.

32. Coating compositions according to claim 31 wherein said aliphatic polyol is glycerine, said hydroxyl functionality is 2.3, the amount of isophthalic acid is 10 mol percent, and said reactive diluent system comprises 2-ethylhexyl acrylate.

33. Coating compositions according to claim 32 wherein said glycol is 1,3-butylene glycol.

34. Coating compositions according to claim 32 wherein said glycol is neopentyl glycol.

35. Coating compositions according to claim 32 wherein said glycol is a mixture of 1,3-butylene glycol and neopentyl glycol.

* * * * *